(12) United States Patent
Asako

(10) Patent No.: US 10,308,214 B2
(45) Date of Patent: Jun. 4, 2019

(54) PRETENSIONER, RETRACTOR, AND SEAT BELT DEVICE

(71) Applicant: JOYSON SAFETY SYSTEMS JAPAN K.K., Tokyo (JP)

(72) Inventor: Tadayuki Asako, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 171 days.

(21) Appl. No.: 15/500,993

(22) PCT Filed: Jul. 24, 2015

(86) PCT No.: PCT/JP2015/071069
§ 371 (c)(1),
(2) Date: Feb. 1, 2017

(87) PCT Pub. No.: WO2016/021422
PCT Pub. Date: Feb. 11, 2016

(65) Prior Publication Data
US 2017/0225651 A1    Aug. 10, 2017

(30) Foreign Application Priority Data

Aug. 7, 2014  (JP) ................................. 2014-161957

(51) Int. Cl.
*B60R 22/46*    (2006.01)
(52) U.S. Cl.
CPC ...... *B60R 22/46* (2013.01); *B60R 2022/4642* (2013.01)
(58) Field of Classification Search
CPC .................. B60R 22/46; B60R 2022/4642
See application file for complete search history.

(56) References Cited

U.S. PATENT DOCUMENTS

2007/0241550 A1    10/2007  Bieg et al.
2009/0261567 A1*   10/2009  Bieg .................. B60R 22/4628
                                                    280/806
(Continued)

FOREIGN PATENT DOCUMENTS

CN         103661241 A       3/2014
DE   10 2010 051 463 A1     5/2012
(Continued)

OTHER PUBLICATIONS

Han Yong, Safety belt pretensioner device, Mar. 26, 2014, EPO, CN 103661241 A1, Machine Translation of Description (Year: 2014).*
(Continued)

*Primary Examiner* — James A English
(74) *Attorney, Agent, or Firm* — Foley & Lardner LLP

(57) ABSTRACT

Provided are a pretensioner, a retractor, and a seat belt device in which strength and slidability of a rod-shaped power transmission member may both be achieved. A pretensioner includes a ring gear on which the spool is rotatably disposed, and power transmission units for transmitting power to the ring gear in an emergency. The power transmission units includes a rod-shaped power transmission member for transmitting power to the ring gear while being plastically deformed, a tip reinforcing member disposed on a tip side of the power transmission member, a pipe for containing the power transmission member, and a gas generator disposed at an end of the pipe. The tip reinforcing member has higher strength than the power transmission member.

9 Claims, 4 Drawing Sheets

(56) References Cited

U.S. PATENT DOCUMENTS

| | | | |
|---|---|---|---|
| 2010/0258668 A1* | 10/2010 | Pechhold | B60R 22/4628 242/374 |
| 2012/0248847 A1* | 10/2012 | Shiotani | B60R 22/4628 297/479 |
| 2015/0298926 A1* | 10/2015 | Okubo | B60R 22/4628 242/535 |
| 2015/0336538 A1* | 11/2015 | Gray | B60R 22/4628 242/389 |
| 2015/0336539 A1* | 11/2015 | Gray | B60R 22/4628 242/389 |
| 2017/0182974 A1* | 6/2017 | Moedinger | B60R 22/4633 |
| 2017/0305386 A1* | 10/2017 | Asako | A44B 11/2561 |
| 2018/0043859 A1* | 2/2018 | Yoshioka | B60R 22/4628 |
| 2018/0065595 A1* | 3/2018 | Yoshioka | B60R 22/4628 |

FOREIGN PATENT DOCUMENTS

| | | |
|---|---|---|
| JP | 2007-522030 A | 8/2007 |
| WO | WO-2011/077749 A1 | 6/2011 |
| WO | WO-2012/143090 A1 | 10/2012 |
| WO | WO-2014/087721 A1 | 6/2014 |

OTHER PUBLICATIONS

International Search Report issued in International Patent Application No. PCT/JP2015/071069 dated Sep. 8, 2015.
European Search Report and Opinion dated Feb. 21, 2018 in corresponding application No. 15829796.

* cited by examiner

PRETENSIONER, RETRACTOR, AND SEAT BELT DEVICE

CROSS-REFERENCE TO RELATED APPLICATIONS

The present application is a U.S. national stage application of International Patent Application No. PCT/JP2015/071069, filed Jul. 24, 2015, which claims the benefit of priority to Japanese Patent Application No. 2014-161957, filed Aug. 7, 2014, the entireties of which are hereby incorporated by reference.

TECHNICAL FIELD

The present invention relates to a pretensioner, a retractor, and a seat belt device, and in particular, relates to a pretensioner, a retractor, and a seat belt device that are suitable for structures having a rod-shaped power transmission member.

BACKGROUND ART

Vehicles such as automobiles generally are provided with seat belt devices for restraining an occupant in a seat that includes a seat portion on which the occupant sits and a backrest portion positioned back of the occupant. Such a seat belt device includes a webbing for restraining the occupant, a retractor for retracting the webbing, a guide anchor that is disposed on a vehicle body side and guides the webbing, a belt anchor for fixing the webbing to the vehicle body side, a buckle disposed on a side surface of the seat, and a tongue disposed on the webbing. The tongue is fitted into the buckle to restrain the occupant in the seat with the webbing. In such the seat belt device, a first end of the webbing is fixed to the belt anchor, and a second end of the webbing is inserted into the guide anchor to be connected to the retractor.

It is becoming common that such the retractor has a pretensioner that eliminates slack in the webbing in an emergency such as a vehicle collision (e.g., refer to Patent Literatures 1 and 2). Pretensioners described in Patent Literatures 1 and 2 include a pinion gear coupled to a spool for winding a webbing, a load transmission element for rotating the pinion gear in a vehicle collision, and a tube (pipe) for containing the load transmission element. The load transmission element described in Patent Literature 1 is a plurality of mass bodies (balls), and the load transmission element described in Patent Literature 2 is a long slender rod member made of a resin.

CITATION LIST

Patent Literatures

Patent Literature 1: JP 2007-522030 W Patent Literature 2: WO 2012/143090 A

SUMMARY OF INVENTION

Technical Problem

In the pretensioner described in Patent Literature 1 described above, since the load transmission element is a plurality of mass bodies, the mass bodies must be supplied to the pinion gear at appropriate timing, otherwise the mass bodies get engaged with the pinion gear to prevent rotation of the pinion gear. Therefore, the pretensioner with such the structure requires various measures.

In contrast, in the pretensioner described in Patent Literature 2, the load transmission element is the rod member made of a resin, and the rod member is plastically deformed to rotate the pinion gear. This eliminates the need for consideration of timing for supplying the rod member to the pinion gear, simplifies a structure, and reduces the number of parts.

For the pretensioner using such the rod member made of a resin, the rod member needs to be engaged with the pinion gear in an initial stage of driving the pinion gear. In this case, since a load is the highest when the rod member firstly collides with the pinion gear, strength that can prevent a tip of the rod member from being chipped or broken must be considered when selecting a material of the rod member. On the other hands, if entire strength of the rod member is increased, it must also be simultaneously considered that this may affect a function that enables the rod member to efficiently slides within a curved pipe.

The present invention is made in view of the above-described problems, and an object of the present invention is to provide a pretensioner, a retractor, and a seat belt device in which strength and slidability of a rod-shaped power transmission member may both be achieved.

Solution to Problem

According to the present invention, there is provided a pretensioner including a ring gear to which the spool for winding a webbing that restrains an occupant is rotatably disposed, and power transmission units for transmitting power to the ring gear in an emergency, wherein the power transmission units includes a rod-shaped power transmission member for transmitting power to the ring gear while being plastically deformed, a tip reinforcing member disposed on a tip side of the power transmission member, a pipe for containing the power transmission member, and a gas generator disposed at an end of the pipe. The tip reinforcing member has higher strength than the power transmission member.

Additionally, according to the present invention, there is provided a retractor including a spool for winding a webbing that restrains an occupant, and a pretensioner for winding the webbing and eliminating slack in an emergency, wherein the pretensioner includes a ring gear to which the spool is rotatably disposed, and power transmission units for transmitting power to the ring gear in an emergency. The power transmission units includes a rod-shaped power transmission member for transmitting power to the ring gear while being plastically deformed, a tip reinforcing member disposed on a tip side of the power transmission member, a pipe for containing the power transmission member, and a gas generator disposed at an end of the pipe. The tip reinforcing member has higher strength than the power transmission member.

Furthermore, according to the present invention, there is provided a seat belt device including a webbing for restraining an occupant, a retractor for winding the webbing, a belt anchor for fixing the webbing on a vehicle body side, a buckle disposed on a side surface of the seat, and a tongue disposed in the webbing, wherein the retractor includes a spool for winding the webbing that restrains the occupant, and a pretensioner for winding the webbing and eliminating slack in an emergency. The pretensioner includes a ring gear to which the spool is rotatably disposed, and power transmission units for transmitting power to the ring gear—in an emergency. The power transmission units includes a rod-shaped power transmission member for transmitting power to the ring gear while being plastically deformed, a tip reinforcing member disposed on a tip side of the power transmission member, a pipe for containing the power transmission member, and a gas generator disposed at an end of the pipe. The tip reinforcing member has higher strength than the power transmission member.

In the above-described pretensioner, the retractor, and the seat belt device, the tip reinforcing member may be formed such that a length with respect to an axial direction of the power transmission member is smaller than a pitch of the ring gear. Moreover, the tip reinforcing member may be fixed to the power transmission member, may be pressed into the pipe, may be molded in the power transmission member, or may be made by hardening a part of the power transmission member. Furthermore, the tip reinforcing member may have higher strength than the ring gear.

Advantageous Effects of Invention

According to the above-described pretensioner, the retractor, and the seat belt device of the present invention, there is disposed the tip reinforcing member with higher strength than the power transmission member on the tip side of the rod-shaped power transmission member. Thereby, in an initial stage of driving the ring gear, a portion with higher strength than the power transmission member can firstly collides with the ring gear to prevent the power transmission member from being chipped or broken. Additionally, for the rod part of the power transmission member, a material or a manufacturing method may be selected in consideration of slidability and an engaging property. Therefore, strength and slidability of a rod-shaped power transmission member may both be achieved.

BRIEF DESCRIPTION OF DRAWINGS

FIGS. 2(A) to 2(G) are cross-sectional views illustrating a tip reinforcing member in which FIG. 2(A) illustrates an embodiment illustrated in FIG. 1, FIG. 2(B) illustrates a first modification, FIG. 2(C) illustrates a second modification, FIG. 2(D) illustrates a third modification, FIG. 2(E) illustrates a fourth modification, FIG. 2(F) illustrates a fifth modification, and FIG. 2(G) illustrates a sixth modification.

FIGS. 3(A) and 3(B) are partial cross-sectional views of a pretensioner illustrating an operation of the present invention in which FIG. 3(A) illustrates an initial stage of driving a ring gear, and FIG. 3(B) illustrates a completion state of driving the ring gear.

DESCRIPTION OF EMBODIMENT

Figure 1:
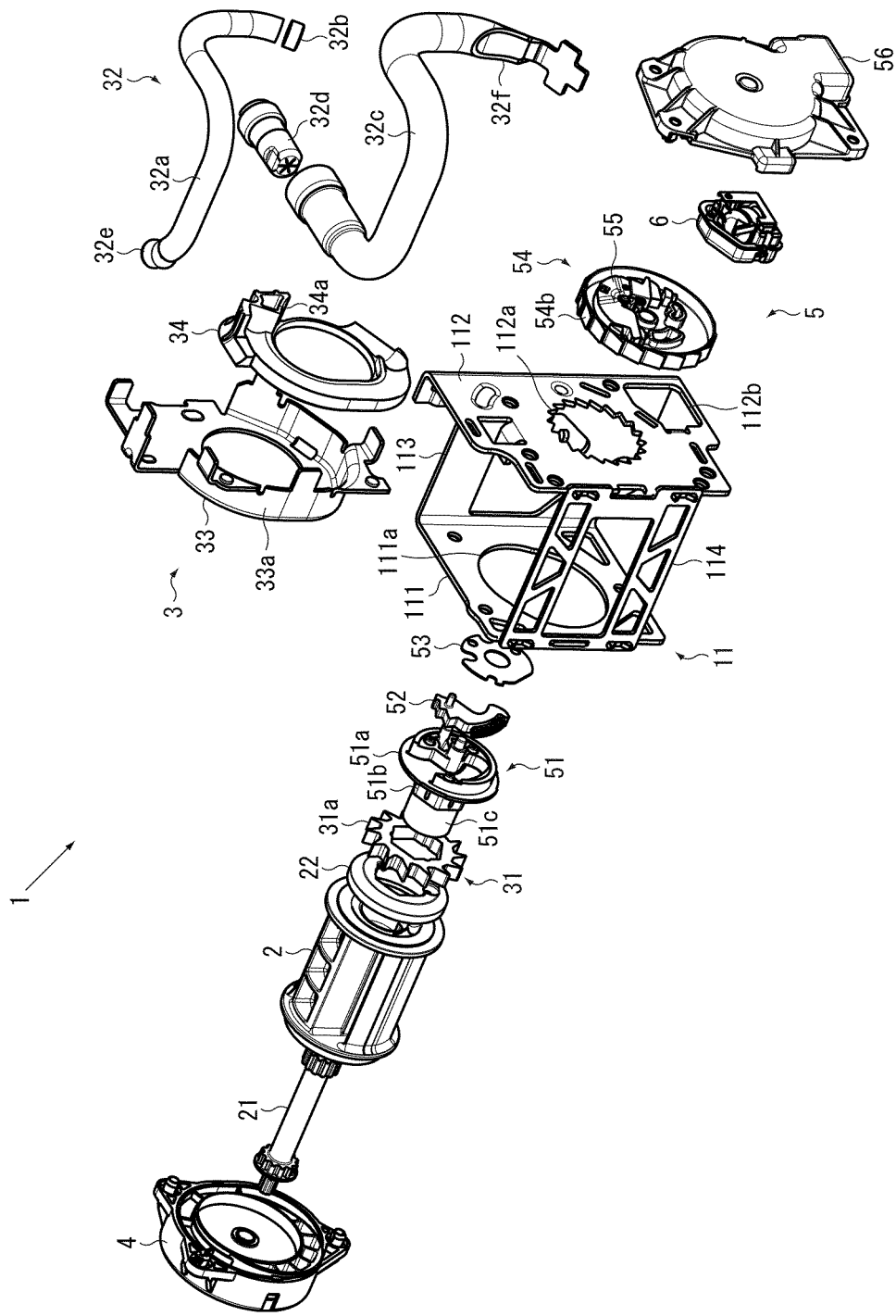
FIG. 1 is a parts developed diagram illustrating a retractor according to an embodiment of the present invention.
Figure 2A:
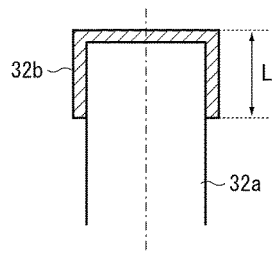
Figure 2B:
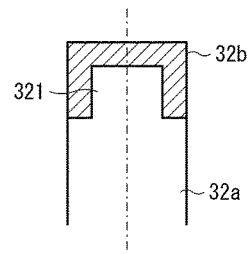
Figure 2C:
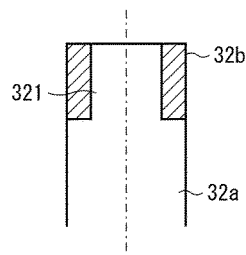
Figure 2D:
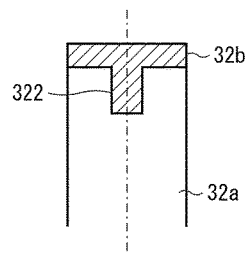
Figure 2E:
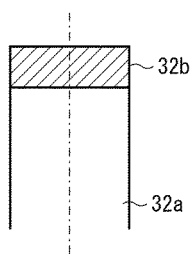
Figure 2F:
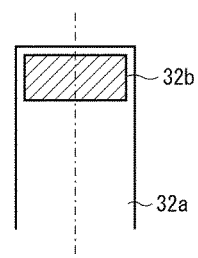
Figure 2G:
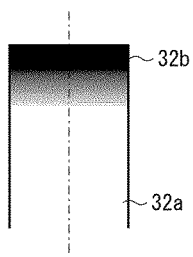

An embodiment of the present invention is described below with reference to FIGS. 1 to 4. Here, FIG. 1 is a parts developed diagram illustrating a retractor according to the embodiment of the present invention. FIGS. 2(A) to 2(G) are cross-sectional views illustrating a tip reinforcing member in which FIG. 2(A) illustrates an embodiment illustrated in FIG. 1, FIG. 2(B) illustrates a first modification, FIG. 2(C) illustrates a second modification, FIG. 2(D) illustrates a third modification, FIG. 2(E) illustrates a fourth modification, FIG. 2(F) illustrates a fifth modification, and FIG. 2(G) illustrates a sixth modification.

As illustrated in FIG. 1, a retractor 1 according to the embodiment of the present invention includes a spool 2 for winding a webbing that restrains an occupant, and a pretensioner 3 for winding the webbing and eliminating slack in an emergency. The pretensioner 3 includes a ring gear 31 on which the spool 2 is rotatably disposed, and power transmission units 32 for transmitting power to the ring gear 31 in an emergency. The power transmission units 32 includes a rod-shaped power transmission member 32a for transmitting power to the ring gear 31 while being plastically deformed, a tip reinforcing member 32b disposed on a tip side of the power transmission member 32a, a pipe 32c for containing the power transmission member 32a, and a gas generator 32d disposed at an end of the pipe 32c. The tip reinforcing member 32b has higher strength than the power transmission member 32a. It should be noted that an illustration of the webbing is omitted from FIG. 1.

The spool 2 is a retracting drum that retracts the webbing and is rotatably contained in a base frame 11 that forms a skeleton of the retractor 1. The base frame 11 includes, for example, a pair of opposed end surfaces 111 and 112, and a side surface 113 for connecting the end surfaces. The base frame 11 may include a tie plate 114 that is opposed to the side surface 113 and is connected to the end surfaces 111 and 112. Additionally, for example, a spring unit 4 is disposed on the end surface 111 side, and the pretensioner 3 and a lock mechanism 5 are disposed on the end surface 112 side. It should be noted that disposition of the spring unit 4, the pretensioner 3, the lock mechanism 5 or the like is not limited to that illustrated.

Furthermore, the end surface 111 of the base frame 11 is formed with an opening 111a through which the spool 2 is inserted, and the end surface 112 of the base frame 11 is formed with an opening 112a that has internal teeth engageable with a pawl 52 of the lock mechanism 5. Furthermore, in an inside of the end surface 112 of the base frame 11, a part of the pretensioner 3 (e.g., the ring gear 31 or the like) is disposed. Furthermore, the lock mechanism 5 is disposed at an outside of the end surface 112 of the base frame 11, and the lock mechanism 5 is contained in a retainer cover 56.

The retainer cover 56 may be disposed with a vehicle sensor 6 for detecting sudden deceleration or inclination of a vehicle body. The vehicle sensor 6 includes, for example, a spherical mass body and a sensor lever that is swung by a movement of the mass body. The vehicle sensor 6 may be fitted into an opening 112b formed on the end surface 112 of the base frame 11.

The spool 2 includes a cavity in a central portion, through which a torsion bar 21 forming an axis is inserted. An end of the spool 2 is connected to an inside of a first end of the torsion bar 21, and a spring core of the spring unit 4 is connected to an outside of the first end of the torsion bar 21. Therefore, the spool 2 is connected to the spring unit 4 via the torsion bar 21, and is energized in a direction in which the webbing is wound by a power spring housed in the spring unit 4. Although not illustrated, a shaft portion may be formed on the end surface of the spool 2 such that the first end of the torsion bar 21 is connected to an inside of the shaft portion, and the spring unit 4 is connected to an outside of the shaft portion. Furthermore, units for applying a retracting force to the spool 2 is not limited to the spring unit 4, but may be other units using an electric motor or the like.

Additionally, a second end of the torsion bar 21 is connected to a locking base 51 of the lock mechanism 5. As explained below, the locking base 51 is engageable with the base frame 11, and is capable of switching between a rotating state and a non-rotating state of the torsion bar 21.

Therefore, even when subjected to a load in a direction of withdrawing the webbing in an operating state of the lock mechanism 5 (the state the locking base 51 is engaged with the base frame 11), a non-rotating state of the spool 2 can be maintained until a load equal to or more than a threshold value occurs in the torsion bar 21. Then, when the load equal to or more than the threshold value occurs in the torsion bar 21, the torsion bar 21 twists so that the spool 2 generates relative rotational movement to withdraw the webbing.

The lock mechanism 5 includes the locking base 51 connected to an end of the torsion bar 21 and is capable of switching between a rotating state and a non-rotating state, the pawl 52 swingably disposed in the locking base 51, and a cover plate 53 for regulating a movement of the pawl 52 in an axial direction, a lock gear 54 disposed at an end of the torsion bar 21 so as to be adjacent to an outside of the locking base 51, a flywheel 55 swingably disposed to the lock gear 54, and the retainer cover 56 for containing these parts and rotatably supporting the locking base 51. It should be noted that the lock mechanism 5 is not limited to that with the structure illustrated, but those with various structures which conventionally exist may be optionally selected and used.

The locking base 51 includes a circular disk part 51a, a ring gear supporting part 51b in substantially hexagonal cylindrical shape that is formed on the spool 2 side of the disk part 51a to support the ring gear 31, and a torsion bar supporting part 51c through which a second end of the torsion bar 21 is inserted. Additionally, the ring gear supporting part 51b is inserted with a bearing 22 that receives a shaft for a pretensioner cover 33 when the pretensioner 3 is actuated.

Although an example has been described where the ring gear 31 is fixed to the locking base 51 here, it is not limited to this structure. For example, a pinion connected to the spool 2 may be inserted through an inside of the ring gear 31 to engage internal teeth of the ring gear 31 with external teeth of the pinion as required thereby the rotation of the ring gear 31 is transmitted to the spool 2 via the pinion.

According to the lock mechanism 5 with the structure described above, when the webbing is faster than a normal speed of withdrawal, that is, a withdrawing force of the webbing exceeds a specified threshold value, the flywheel 55 swings and engages with internal teeth (not illustrated) of the retainer cover 56, and the rotation of the lock gear 54 is regulated. Additionally, when the vehicle sensor 6 is actuated, the sensor lever thereof engages with external teeth 54b of the lock gear 54, and rotation of the lock gear 54 is regulated.

When the rotation of the lock gear 54 is regulated, the locking base 51 and the lock gear 54 are rotated relative to each other, and the pawl 52 swings along with this relative rotation to engage a tip of the pawl 52 with the internal teeth that are formed in the opening 112a of the base frame 112. As a result, rotation of the locking base 51 is regulated, and rotation of the spool 2 is also regulated. Thus, the withdrawal of the webbing is locked.

It should be noted that, at normal time (when the withdrawing force of the webbing is equal to or less than a specified threshold value), the lock mechanism 5 is not actuated, and the locking base 51 and the lock gear 54 are rotated together along with rotation of the spool 2. Thus, since the locking base 51 and the lock gear 54 are not rotated relative to each other at the normal time, the pawl 52 is configured to maintain a state of being retracted to a position where the pawl 52 does not interfere with the internal teeth that are formed in the opening 112a of the base frame 112.

The pretensioner 3 includes the ring gear 31, the power transmission units 32, the pretensioner cover 33 for housing the ring gear 31, and a guide spacer 34 for guiding a movement of the power transmission member 32a. The pretensioner cover 33 is disposed inside of the end surface 112 of the base frame 11, and the guide spacer 34 is contained in the pretensioner cover 33. Additionally, the ring gear 31 is disposed so as to be positioned between the pretensioner cover 33 and the inside of the end surface 112 of the base frame 11. The ring gear 31 includes a plurality of engaging teeth 31a that are formed so as to protrude outward in a radial direction. The ring gear 31 is also referred to as a pinion gear.

The power transmission units 32 includes the rod-shaped power transmission member 32a for transmitting power to the ring gear 31 while being plastically deformed, the tip reinforcing member 32b disposed on the tip side of the power transmission member 32a, the pipe 32c for containing the power transmission member 32a, the gas generator 32d disposed at the end of the pipe 32c, and a piston 32e disposed on a rear end side of the power transmission member 32a.

The pipe 32c is disposed at a position where the tip faces the engaging teeth 31a of the ring gear 31 (between the pretensioner cover 33 and the inside of the end surface 112 of the base frame 11). The rear end side of the pipe 32c extends by a length required for the movement of the power transmission member 32a, and is formed so as to be curved along an outline of the retractor 1. As illustrated in FIG. 1, the tip of the pipe 32c is formed with a cut 32f in a part of a periphery, and is structured such that the engaging teeth 31a of the ring gear 31 pass through in the pipe 32c from the cut 32f to be able to rotate.

Additionally, the gas generator 32d is disposed at the rear end of the pipe 32c, so that high pressure gas can be supplied into the pipe 32c. The gas generator 32d is, for example, a micro gas generator, and structured to inject gas into the pipe 32c in response to a detection signal from a vehicle body. Additionally, the piston 32e is inserted between the gas generator 32d and the power transmission member 32a. The piston 32e has a function of forming a pressure-receiving part by filling a gap with the pipe 32c at the rear end portion of the power transmission member 32a, and pushing out the power transmission member 32a when the gas is supplied.

The power transmission member 32a is, for example, a rod-shaped long slender part formed of a homopolymer of a POM resin, and is contained in the pipe 32c. The tip reinforcing member 32b has, for example, a cap shape that covers the tip of the tip reinforcing member 32b as illustrated in FIG. 2(A), and the tip of the power transmission member 32a is fitted in a recess of the tip reinforcing member 32b.

Additionally, the tip reinforcing member 32b has higher strength than at least the power transmission member 32a. The "strength" here is intended to include indicators such as tensile strength, yield strength, bending strength, hardness, ductility, and toughness. Therefore, for example, the tip reinforcing member 32b only has to be formed harder than a resin that forms the power transmission member 32a, which may be made of metal such as aluminum or iron, or may be made of a resin. Additionally, the tip reinforcing member 32b is formed such that a length L of a peripheral surface with respect to an axial direction of the power transmission member 32a (the direction indicated by dotted-chain lines in the figure) is smaller than a pitch P (see FIG. 3(A)) of the ring gear 31.

Figure 3A:
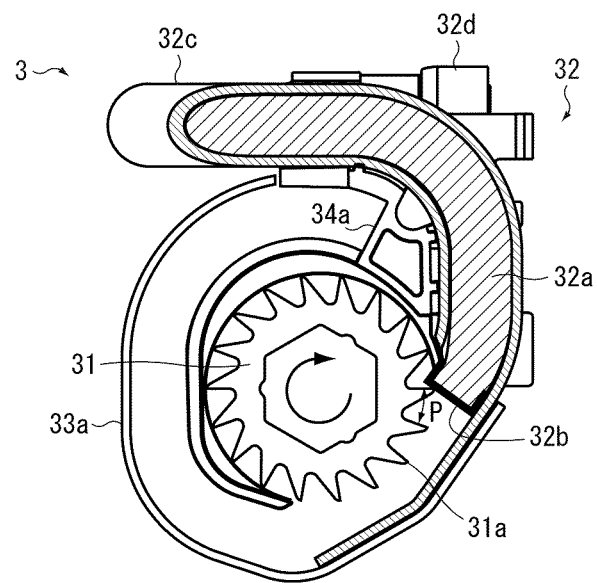

The power transmission units 32 that includes such the tip reinforcing member 32b is maintained in a state in which the power transmission member 32a and the tip reinforcing member 32b are contained in the pipe 32c at the normal time (when the pretensioner 3 is not actuated). Then, in an emergency such as a vehicle collision (when the pretensioner 3 is actuated), the power transmission member 32a and the tip reinforcing member 32b are pushed out in the pipe 32c by the gas supplied by the gas generator 32d, and are released outside from the tip of the pipe 32c as illustrated in FIG. 3(A).

Since the tip reinforcing member 32b is disposed at the tip of the power transmission member 32a, the tip reinforcing member 32b firstly contacts with the engaging teeth 31a of the ring gear 31 when pushed out from the tip of the pipe 32c. Since the tip reinforcing member 32b has higher strength than the power transmission member 32a, the tip of the power transmission member 32a can endure an impact of collision with the engaging teeth 31a of the ring gear 31. Additionally, in order to prevent the tip reinforcing member 32b from being broken, the tip reinforcing member 32b may have higher strength than the engaging teeth 31a of the ring gear 31.

Figure 3B:
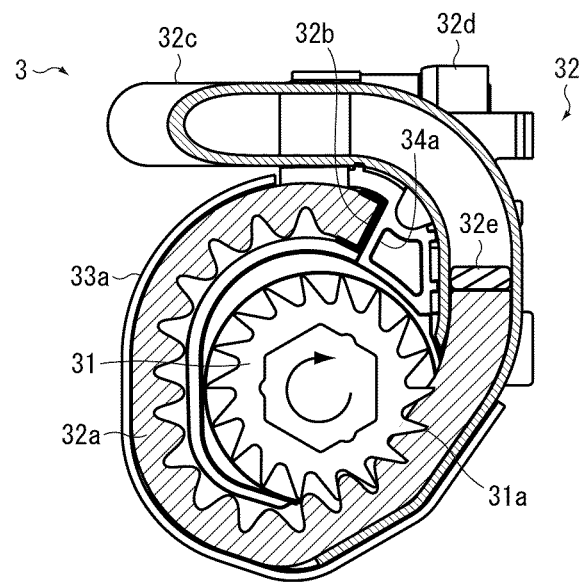

Furthermore, since the tip reinforcing member 32b has a relationship of the length L in the axial direction<the pitch P, the tip reinforcing member 32b does not obstruct rotation of the ring gear 31. Therefore, contact of the tip reinforcing member 32b with the engaging teeth 31a starts rotation of the ring gear 31, and the power transmission member 32a is to be engaged with the engaging teeth 31a, from one of the engaging teeth 31a that is subsequent to one of the engaging teeth 31a that is in contact with the tip reinforcing member 32b. The power transmission member 32a moves along a side wall 33a of the pretensioner cover 33 while being plastically deformed by engaging with engaging teeth 31a, and eventually reaches and stops at a stopper 34a formed in the guide spacer 34 as illustrated in FIG. 3(B).

According to the above-described pretensioner 3 and the retractor 1 of the embodiment, there is disposed the tip reinforcing member 32b with higher strength than the power transmission member 32a on the tip side of the rod-shaped power transmission member 32a. Thereby, in the initial stage of driving the ring gear 31, a portion with higher strength than the power transmission member 32a can firstly collide with the ring gear 31 and prevent the power transmission member 32a from being chipped or broken. Additionally, for the power transmission member 32a, a material or a manufacturing method may be selected in consideration of slidability and an engaging property. Therefore, strength and slidability of the rod-shaped power transmission member 32a may both be achieved.

Next, modifications of the tip reinforcing member 32b are described with reference to FIGS. 2(B) to 2(G). A first modification illustrated in FIG. 2(B) is made by forming a projection 321 with a small diameter at the tip of the power transmission member 32a, and fitting a cap-shaped tip reinforcing member 32b to the projection 321. In this case, an outer diameter of the tip reinforcing member 32b and an outer diameter of the main body part of the power transmission member 32a may have substantially the same size.

A second modification illustrated in FIG. 2(C) is made by forming a projection 321 with a small diameter at a tip of the power transmission member 32a, and fitting a cylindrical-shaped tip reinforcing member 32b to the projection 321. In this case, an outer diameter of the tip reinforcing member 32b and an outer diameter of the main body part of the power transmission member 32a may have substantially the same size.

A third modification illustrated in FIG. 2(D) is made by forming a recess 322 with a small diameter at a tip of the power transmission member 32a, and fitting a shaft portion of a cross-sectional T-shaped tip reinforcing member 32b in the recess 322. In this case, an outer diameter of the tip reinforcing member 32b and an outer diameter of the main body part of the power transmission member 32a may have substantially the same size.

A fourth modification illustrated in FIG. 2(E) is made by disposing a cylindrical-shaped tip reinforcing member 32b with substantially the same outer diameter at a tip of the power transmission member 32a. The tip reinforcing member 32b may be fixed to a tip end surface of the power transmission member 32a with an adhesive or the like, or may be disposed at a position adjacent to the tip end surface of the power transmission member 32a by pressing into the pipe 32c. In this case, the tip reinforcing member 32b may be disposed at a position apart from the tip of the power transmission member 32a. In the other words, it is sufficient that the tip reinforcing member 32b be positioned at the tip of the power transmission member 32a, and that the tip reinforcing member 32b be structured so as to firstly contact with the ring gear 31 when the tip of the power transmission member 32a is released from the pipe 32c.

A fifth modification illustrated in FIG. 2(F) is made by embedding a substantially cylindrical-shaped tip reinforcing member 32b at the tip of the power transmission member 32a. The tip reinforcing member 32b is, for example, formed of metal, reinforced fiber, or the like, and molded with a resin.

A sixth modification illustrated in FIG. 2(G) is made by molding the tip of the power transmission member 32a with a hard resin. The tip reinforcing member 32b is formed, for example, by two-color molding using a resin that forms the power transmission member 32a, and a resin with higher strength than the resin that forms the power transmission member 32a.

As described above, if the tip reinforcing member 32b is positioned at the tip of the power transmission member 32a and is structured so as to be able to firstly collide when contacting the ring gear 31, the tip reinforcing member 32b may be fixed to the power transmission member 32a, may be pressed into the pipe 32c, may be molded in the power transmission member 32a, or may be made by hardening a part of the power transmission member 32a.

Figure 4:
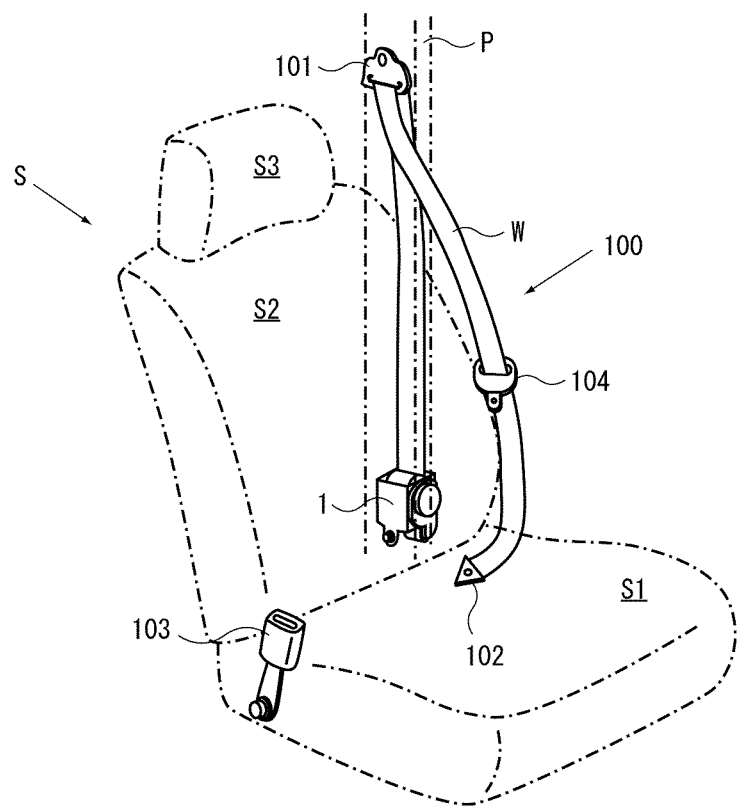
FIG. 4 is an overall structure diagram illustrating a seat belt device according to the embodiment of the present invention.

Next, a seat belt device according to the embodiment of the present invention is described below with reference to FIG. 4. Here, FIG. 4 is an overall structure diagram illustrating the seat belt device according to the embodiment of the present invention. It should be noted that, for convenience of description, parts other than the seat belt device are indicated by dotted-chain lines in FIG. 4.

A seat belt device 100 according to the embodiment illustrated in FIG. 4 includes a webbing W for restraining an occupant, a retractor 1 for retracting the webbing W, a guide anchor 101 that is disposed on a vehicle body side and guides the webbing W, a belt anchor 102 for fixing the webbing W to the vehicle body side, a buckle 103 that is disposed on a side surface of a seat S, and a tongue 104 that is disposed in the webbing W. The retractor 1 has the structure illustrated in FIG. 1.

Components other than the retractor 1 are briefly described below. The seat S includes, for example, a seat portion S1 on which the occupant sits, a backrest portion S2 that is positioned back of the occupant, and a headrest portion S3 for supporting the head of the occupant. The retractor 1 is disposed, for example, in a B-pillar P of the vehicle body. In general, the buckle 103 is often disposed on a side surface of the seat portion S1, and the belt anchor 102 is often disposed on a lower surface of the seat portion S1. Furthermore, the guide anchor 101 is often disposed at the B-pillar P. Then, a first end of the webbing W is connected to the belt anchor 102, and a second end of the webbing W is connected to the retractor 1 via the guide anchor 101.

Accordingly, in order to fit the tongue 104 into the buckle 103, the webbing W is withdrawn from the retractor 1 while being slid through an insertion hole of the guide anchor 101. Furthermore, when the occupant fastens the seat belt or releases the seat belt to leave the vehicle, the webbing W is retracted due to operation of the spring unit 4 of the retractor 1 until a certain amount of load is applied to the webbing W.

The above-described seat belt device 100 is made by applying the above-described retractor 1 according to the above-described embodiment to a typical seat belt device for a front seat. According to the seat belt device 100 of the embodiment, there is disposed the tip reinforcing member 32b with higher strength than the power transmission member 32a on the tip side of the rod-shaped power transmission member 32a. Thereby, in the initial stage of driving the ring gear 31, a portion with higher strength than the power transmission member 32a can firstly collides with the ring gear 31 to prevent the power transmission member 32a from being chipped or broken. It should be noted that the seat belt device 100 is not limited to the use for a front seat, but it may be easily applied to, for example, a rear seat with the guide anchor 101 omitted.

The present invention is not limited to the above-described embodiment. Of course, the present invention can be changed in various manners without departing from the gist of the present invention. For example, the present invention may be applied to a seat belt device used for a conveyance other than the vehicle.

REFERENCE SIGNS LIST 1 retractor
2 spool
3 pretensioner
4 spring unit
5 lock mechanism
6 vehicle sensor
11 base frame
21 torsion bar
22 bearing
31 ring gear
31a engaging teeth
32 power transmission units
32a power transmission member
32b tip reinforcing member
32c pipe
32d gas generator
32e piston
32f cut
33 pretensioner cover
33a side wall
34 guide spacer
34a stopper
51 locking base
51a disk part
51b ring gear supporting part
51c torsion bar supporting part
52 pawl
53 cover plate
54 lock gear
54a internal teeth
54b external teeth
55 flywheel
56 retainer cover
100 seat belt device
101 guide anchor
102 belt anchor
103 buckle
104 tongue
111, 112 end surface
111a opening
112a, 112b opening
113 side surface
114 tie plate
321 projection
322 recess

The invention claimed is:

1. A pretensioner comprising:
a ring gear to which a spool is rotatably disposed, the spool winding a webbing for restraining an occupant; and
power transmission units for transmitting power to the ring gear in an emergency, wherein
the power transmission units each comprise a rod-shaped power transmission member for transmitting power to the ring gear while being plastically deformed, a tip reinforcing member disposed on a tip side of the power transmission member, a pipe for containing the power transmission member, and a gas generator disposed at an end of the pipe,
the tip reinforcing member has higher strength than the power transmission member, and,
the tip reinforcing member is formed such that a length with respect to an axial direction of the power transmission member is smaller than a pitch of the ring gear.

2. The pretensioner according to claim 1, wherein the tip reinforcing member is fixed to the power transmission member, pressed into the pipe, molded in the power transmission member, or made by hardening a part of the power transmission member.

3. The pretensioner according to claim 1, wherein the tip reinforcing member has higher strength than the ring gear.

4. A retractor comprising:
a spool for winding a webbing that restrains an occupant; and
a pretensioner for winding the webbing and eliminating slack in an emergency, wherein
the pretensioner comprising a ring gear to which a spool is rotatably disposed; and
power transmission units for transmitting power to the ring gear in an emergency, wherein
the power transmission units each comprise a rod-shaped power transmission member for transmitting power to the ring gear while being plastically deformed, a tip reinforcing member disposed on a tip side of the power transmission member, a pipe for containing the power transmission member, and a gas generator disposed at an end of the pipe,
the tip reinforcing member is formed such that a length with respect to an axial direction of the power transmission member is smaller than a pitch of the ring gear.

5. The retractor according to claim 4, wherein the tip reinforcing member is fixed to the power transmission member, pressing into the pipe, molded in the power transmission member, or made by hardening a part of the power transmission member.

6. The retractor according to claim 4, wherein the tip reinforcing member has higher strength than the ring gear.

7. A seat belt device comprising:
a webbing for restraining an occupant;
a retractor for winding the webbing;
a belt anchor for fixing the webbing on a vehicle body side;
a buckle disposed on a side surface of the seat; and
a tongue disposed in the webbing, wherein
the retractor comprising a spool for winding the webbing; and
a pretensioner for winding the webbing and eliminating slack in an emergency, wherein
the pretensioner comprising a ring gear to which a spool is rotatably disposed; and
power transmission units for transmitting power to the ring gear in an emergency, wherein the power transmission units each comprise a rod-shaped power transmission member for transmitting power to the ring gear while being plastically deformed, a tip reinforcing member disposed on a tip side of the power transmission member, a pipe for containing the power transmission member, and a gas generator disposed at an end of the pipe,
the tip reinforcing member has higher strength than the power transmission member, and
the tip reinforcing member is formed such that a length with respect to an axial direction of the power transmission member is smaller than a pitch of the ring gear.

8. The seat belt device according to claim 7, wherein the tip reinforcing member is fixed to the power transmission member, pressed into the pipe, molded in the power transmission member, or made by hardening a part of the power transmission member.

9. The seat belt device according to claim 7, wherein the tip reinforcing member has higher strength than the ring gear.

* * * * *